United States Patent [19]

Sekiguchi

[11] Patent Number: 5,420,916
[45] Date of Patent: May 30, 1995

[54] SIGNALING NETWORK HAVING COMMON SIGNALING NODE FOR PROTOCOL CONVERSION

[75] Inventor: Katsumi Sekiguchi, Tokyo, Japan

[73] Assignee: NEC Corporation, Tokyo, Japan

[21] Appl. No.: 24,177

[22] Filed: Feb. 22, 1993

[30] Foreign Application Priority Data

Feb. 20, 1992 [JP] Japan .................. 4-033478

[51] Int. Cl.$^6$ .................. H04M 7/00; H04J 3/02
[52] U.S. Cl. .................. 379/230; 370/85.13; 379/219; 379/229
[58] Field of Search .................. 379/201, 207, 219, 220, 379/225, 229, 230, 231, 234; 370/94.1, 85.13

[56] References Cited

U.S. PATENT DOCUMENTS 5,086,426  2/1992  Tsukakoshi et al. .................. 370/94.1

OTHER PUBLICATIONS

IBM Technical Disclosure Bulletin, "Transparent Message Routing Between an SS#7 Network and X. 25 Network," Aug. 1992, pp. 434–436.

Primary Examiner—James L. Dwyer
Assistant Examiner—Harry S. Hong
Attorney, Agent, or Firm—Foley & Lardner

[57] ABSTRACT

A common channel signaling network comprises a first and a second subnetwork each being composed of interconnected signaling nodes having a service entity. The first and second subnetworks employ different versions of protocol for message transmission. A common signaling node is provided for protocol conversion. As the common signaling node receives a message from a service entity of each subnetwork, it converts the message format to the protocol of the other subnetwork, and transmits it to a service entity of the other subnetwork.

1 Claim, 2 Drawing Sheets

SIGNALING NETWORK HAVING COMMON SIGNALING NODE FOR PROTOCOL CONVERSION

BACKGROUND OF THE INVENTION

1. Field of the Invention

The present invention relates generally to switched communications networks, and more specifically to a common channel signaling network that exchanges signaling information within the signaling network for the purpose of establishing a connection within a switched communications network.

2. Description of the Related Art

A common channel signaling system is a network of signaling nodes implemented by stored program controlled electronic switching systems and interconnected by signaling data links. A signaling node includes a service entity implemented with a service control point to provide high-level services such as credit card validation. The network may comprise a plurality of signaling subnetworks each using a different version of protocol for communication between the service entities of the respective subnetwork. Messages between service entities can be transported within the same signaling subnetwork by using the protocol of the subnetwork. However, due to the different protocol versions of the subnetworks it is impossible for a service entity of each subnetwork to have access to a service entity of the other subnetwork.

SUMMARY OF THE INVENTION

It is therefore an object of the present invention to provide a signaling network that enables service entities of one signaling subnetwork to gain access to service entities of another signaling subnetwork.

According to the present invention, there is provided a common channel signaling network comprising a first and a second subnetwork. The first subnetwork includes a plurality of interconnected signaling nodes each including a service entity, where the signaling nodes of the first subnetwork transmit and receive messages of a first protocol version. The second subnetwork includes a plurality of interconnected signaling nodes each including a service entity, where the signaling nodes of the second subnetwork transmit and receive messages of a second protocol version. A common signaling node is connected to the signaling nodes of the first and second subnetworks for receiving a message from each of the subnetworks and transmitting the received message to the other subnetwork, the common signaling node including a protocol converter for converting a received message of the first protocol version from the first subnetwork to a message of the second protocol version for transmission to the second subnetwork and for converting a received message of the second protocol version from the second subnetwork to a message of the first protocol version for transmission to the first subnetwork. The common signaling node further includes a common service entity and a second protocol converter for converting a message from the common service entity to one of said first and second protocol versions depending on a destination address contained in the message from the common service entity and converting a message from said first and second subnetworks to a protocol version of said common service entity.

BRIEF DESCRIPTION OF THE DRAWINGS

The present invention will be described in further detail with reference to the accompanying drawings, in which.

DETAILED DESCRIPTION

Figure 1:
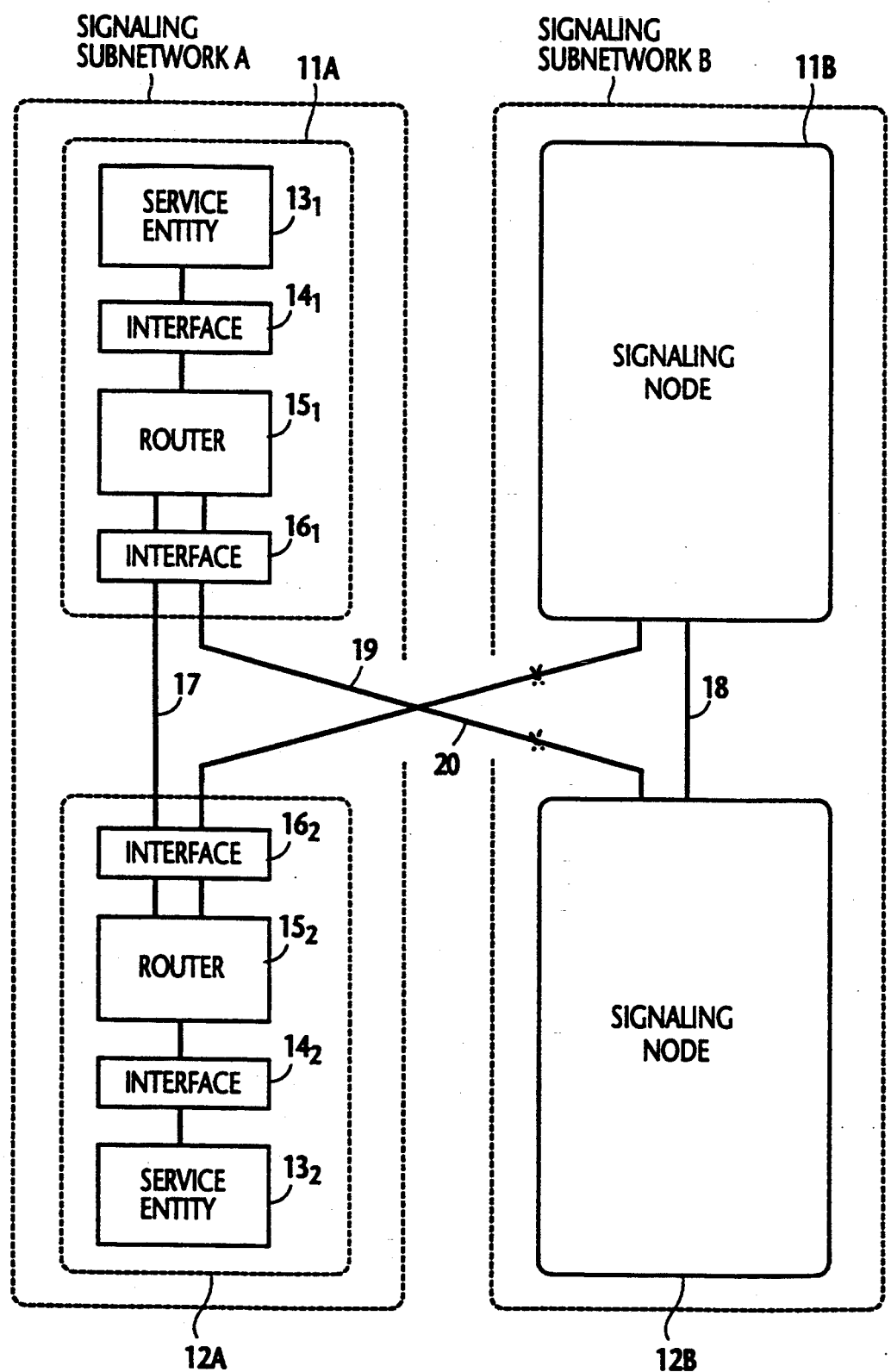
FIG. 1 is a block diagram of a prior art common channel signaling network.

Prior to the description of the present invention, reference is first made to FIG. 1 in which a prior art common channel signaling network is illustrated. The prior art signaling network comprises signaling subnetworks A and B, each consisting of stored program controlled (SPEC) switching systems 11 and 12 interconnected within each subnetwork by signaling data links 17 and 18 through which signaling messages are exchanged according to the protocols of the CHIT signaling system No. 7. Each of the switching systems is a signaling node (signaling point or signal transfer point) of the network and Includes a service entity 13, which is implemented with a "service control point" and connected via interface 14 to a route 15, the router being connected via interface 16 to the signaling data link 17 or 18. The service entity 13 is a database that stores information relevant to customer services such as calling card validation, automatic number identification validation, and 800 number service translation. The signaling nodes 11A and 12B are interconnected by a signaling data link 19 and signaling nodes 11B and 12A are likewise interconnected by a signaling data link 20. If signaling node 11A attempts to access signaling node 12A, service entity $13_1$ supplies a transmit-request message containing a destination address to router $15_1$. This message is in the format of protocol version A. The message is switched by the router $15_1$ according to the destination address and forwarded through interface $16_1$ onto signaling data link 17 and transmitted to signaling node 12A. The transmitted message is entered via interface $16_2$ to router $15_2$ of signaling node 12A where the destination address of the message is used to direct the message via interface $14_2$ to the destination service entity $13_2$. Signaling messages of protocol version A are exchanged between service entities $13_1$ and $13_2$. Similar processes occur in the signaling subnetwork B where the signaling nodes 11B and 12B exchange messages having the format of a common protocol version B which is incompatible with the protocol version A of subnetwork A. Because of this Incompatibility the signaling nodes of each subnetwork are Inaccessible as marked X in FIG. 1 from the other subnetwork even though physical signaling data links 19 and 20 are provided between them.

Figure 2:
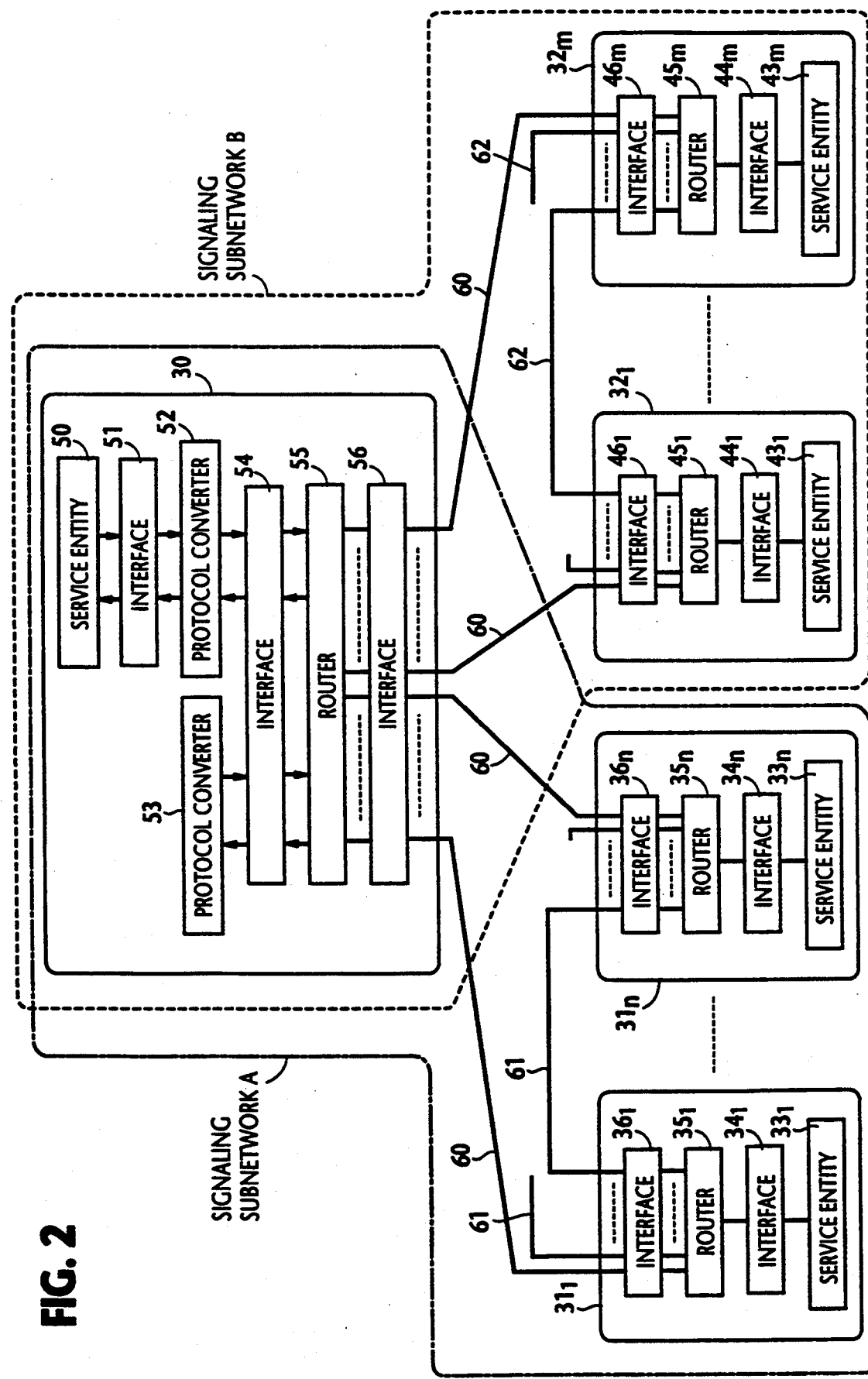
FIG. 2 is a block diagram of a common channel signaling network according to the present invention.

An integrated common channel signaling network of this invention is shown In FIG. 2 that permits access from any switching node of a signaling subnetwork to any switching node of another signaling subnetwork even though different protocol versions are used within each of the subnetworks. In FIG. 2, the signaling network of this invention comprises a signaling subnetwork A consisting of signaling nodes $31_1 \sim 31_n$ and a signaling subnetwork B consisting of signaling nodes $32_1 \sim 32_m$ of identical construction to those of the subnetwork A. Signaling node $31_1 \sim 31_n$ employ protocol version A, and signaling node $32_1 \sim 32_m$ employ protocol versions B. Each signaling node of subnetwork A is interconnected with the other signaling nodes of the same subnetwork by signaling data links 61 and each signaling node of subnetwork B is likewise interconnected with the other nodes of subnetwork B by signaling data links 62.

There is provided a signaling node 30 which belongs to both subnetworks A and B to serve as a common signal transfer point for all the signaling nodes of the network through signaling data links 60. The common signaling node 30 includes a service entity 50 connected via interface 51 to a protocol converter 52 which is connected via interface 54 to a router 55 to which signaling data links 60 are terminated via interface 56. Protocol converter 52 performs a translation of protocols from the internal protocol of the signaling node 30 to protocol A or B depending on the address of a message it receives. Another protocol converter 53 is connected to the router 55 via interface 54 to provide protocol conversions between version A and version B.

When the common signaling node 30 provides access to the signaling node $31_1$, service entity 50 feeds an internal protocol message containing the address of service entity $33_1$ to protocol conversion unit 52, where the protocol of the destination signaling node is identified and the protocol of the message is converted to protocol version A and applied to router 56. The message is switched by the router 56 according to the destination address of the message and transmitted to the signaling node $31_1$. The message received by the signaling node $31_1$ is passed to the router 351 where the destination address of the message is used to route it to the service entity $33_1$.

On the other hand, when the service entity $33_1$ accesses the service entity 50, it sends a message in protocol version A to router $34_1$ and routed via interfaces $36_1$, 56 to router 55 through which the message is routed to protocol converter 52 where the protocol version A of the message is converted to the internal protocol of the signaling node 30 and applied to service entity 50.

If the service entity of signaling node $31_1$ accesses the service entity of signaling node $32_1$, a message of protocol version A is sent from service entity $33_1$ to router 55 of common node 30 where it is routed to protocol converter 53 where the destination address is examined and the message is converted to protocol version B and switched back through router 55 to to the destination service entity $43_1$. A message of protocol version B is sent from the service entity $43_1$ and received by router 55 at common node 30 and applied to protocol converter 53 where the destination address is examined and the message is converted to protocol version A and transmitted to the destination service entity $33_1$.

What is claimed is:

1. A common channel signaling network comprising:
   a first subnetwork including a plurality of interconnected signaling nodes each including a service entity, the service entities of the first subnetwork transmitting and receiving messages of a first protocol version;
   a second subnetwork including a plurality of interconnected signaling nodes each including a service entity, the service entities of the second subnetwork transmitting and receiving messages of a second protocol version; and
   a common signaling node connected to the signaling nodes of said first and second subnetworks for receiving a message from a service entity of each one of the first and second subnetworks and transmitting a received message from one of the first and second subnetworks to a service entity of the other of the first and second subnetworks, the common signaling node including a first protocol converter for converting said first protocol version of a message from said first subnetwork to said second protocol version for transmission to said second subnetwork and for converting said second protocol version of a message from said second subnetwork to said first protocol version for transmission to the first subnetwork;
   a common service entity; and
   a second protocol converter for converting a message from the common service entity to one of said first and second protocol versions depending on a destination address contained in the message from the common service entity and converting a message from said first and second subnetworks to a protocol version of said common service entity.

* * * * *